US012600673B2

(12) United States Patent
Sato et al.

(10) Patent No.: US 12,600,673 B2
(45) Date of Patent: Apr. 14, 2026

(54) COMPOSITE MEMBER, AND HEAT GENERATION DEVICE, BUILDING MEMBER AND LIGHT EMITTING DEVICE, EACH OF WHICH USES SAME

(71) Applicant: Panasonic Intellectual Property Management Co., Ltd., Osaka (JP)

(72) Inventors: Natsuki Sato, Osaka (JP); Naoki Kurizoe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 535 days.

(21) Appl. No.: 17/440,053

(22) PCT Filed: Feb. 4, 2020

(86) PCT No.: PCT/JP2020/004117
§ 371 (c)(1),
(2) Date: Sep. 16, 2021

(87) PCT Pub. No.: WO2020/195183
PCT Pub. Date: Oct. 1, 2020

(65) Prior Publication Data
US 2022/0185737 A1 Jun. 16, 2022

(30) Foreign Application Priority Data

Mar. 26, 2019 (JP) ................................. 2019-059090

(51) Int. Cl.
*C04B 35/10* (2006.01)
*C04B 35/80* (2006.01)
(Continued)

(52) U.S. Cl.
CPC .............. *C04B 35/10* (2013.01); *C04B 35/80* (2013.01); *E04B 1/76* (2013.01); *E04F 13/14* (2013.01);
(Continued)

(58) Field of Classification Search
CPC . C04B 35/10; C04B 35/80; C04B 2103/0097; C04B 2235/3218;
(Continued)

(56) References Cited

U.S. PATENT DOCUMENTS

| 5,122,291 A | 6/1992 | Wolff et al. |
| 5,457,080 A | 10/1995 | Takano et al. |

(Continued)

FOREIGN PATENT DOCUMENTS

| JP | H06-200113 A | 7/1994 |
| JP | 08-013699 B2 | 2/1996 |

(Continued)

OTHER PUBLICATIONS

Yamaguchi Mica Co., Ltd., Mica general information, Aug. 6, 2013, obtained from https://web.archive.org/web/20130806171713/https://www.yamaguchi-mica.com/E/MICA/mica_outline.html (Year: 2013).*

(Continued)

*Primary Examiner* — Brian Handville

(74) *Attorney, Agent, or Firm* — Renner, Otto, Boiselle & Sklar, LLP

(57) ABSTRACT

A composite member includes a matrix part including an inorganic substance, and an organic infrared absorbing material present in a dispersed state inside the matrix part. The composite member has a porosity of 20% or less in a section of the matrix part. A heat generation device includes the composite member, and an infrared light source for irradiating the composite member with infrared rays. A building member and a light emitting device each include the composite member, or the heat generation device.

20 Claims, 9 Drawing Sheets

(a)

(b)

(51) Int. Cl.

| | |
|---|---|
| *E04B 1/76* | (2006.01) |
| *E04F 13/14* | (2006.01) |
| *G02B 5/22* | (2006.01) |
| *C04B 103/00* | (2006.01) |

(52) U.S. Cl.
CPC ........ *G02B 5/22* (2013.01); *C04B 2103/0097* (2013.01); *C04B 2235/3218* (2013.01); *C04B 2235/3284* (2013.01); *C04B 2235/386* (2013.01); *C04B 2235/3865* (2013.01); *E04F 2290/023* (2013.01)

(58) Field of Classification Search
CPC ...... C04B 2235/3284; C04B 2235/386; C04B 2235/3865; C04B 2235/604; C04B 2235/9646; C04B 35/453; C04B 35/6325; C04B 35/645; C04B 35/111; C04B 2111/00258; C04B 2111/00405; C04B 30/00; C04B 38/0038; C04B 2111/00844; C04B 2111/80; C04B 38/00; E04B 1/76; E04F 13/14; E04F 2290/023; G02B 5/22; G02B 5/003; Y02B 30/00
See application file for complete search history.

(56) References Cited

U.S. PATENT DOCUMENTS

| | | | | |
|---|---|---|---|---|
| 2005/0270960 A1* | 12/2005 | Meinders | ............... | G11B 7/252 |
| 2007/0056457 A1 | 3/2007 | Iwai et al. | | |
| 2009/0272297 A1 | 11/2009 | Stratton | | |
| 2011/0256381 A1* | 10/2011 | Shula | ................... | G02F 1/0045 |
| | | | | 428/323 |
| 2012/0157583 A1* | 6/2012 | Shiao | ................... | C23C 18/122 |
| | | | | 427/372.2 |
| 2016/0011348 A1 | 1/2016 | Hirakoso | | |
| 2017/0138635 A1* | 5/2017 | Coggins | ................. | H05B 3/283 |
| 2019/0112227 A1* | 4/2019 | Skorina | ................. | C04B 14/043 |
| 2019/0134893 A1 | 5/2019 | Yabuta | | |

FOREIGN PATENT DOCUMENTS

| | | | |
|---|---|---|---|
| JP | H10-186122 | A | 7/1998 |
| JP | 11-198114 | A | 7/1999 |
| JP | 2004-339568 | A | 12/2004 |
| JP | 2005-530891 | A | 10/2005 |
| JP | 2012-140753 | A | 7/2012 |
| JP | 2017-147336 | A | 8/2017 |
| JP | 2019-084824 | A | 6/2019 |
| WO | 2004/000946 | A1 | 12/2003 |
| WO | 2014/168189 | A1 | 10/2014 |
| WO | 2017/200843 | A1 | 11/2017 |

OTHER PUBLICATIONS

Shinji Noguchi et al.; "Development of (polymer/liquid crystal) composite films showing a light-shutter function in optical communication wavelength"; Proceedings of Japanese Liquid Crystal Society Annual Meeting, Japan, The Japanese Liquid Crystal Society, Sep. 13, 2009, pp. 187-187. Partial English language translation.

J. Akedo; "Aerosol Deposition Method and its Application": Advanced Manufacturing Research Institute, National Institute of Advanced Industrial Science and Technology; accepted Aug. 9, 2004, with English translation.

I. Rosenthal; "Thermochromic and Hyperchromic Effects in Rhodamine B Solutions"; The Journal of Physical Chemistry; vol. 83, No. 3; 1979.

Extended European Search Report for corresponding EP Application No. 20777231.0 issued May 2, 2022.

International Search Report for corresponding Application No. PCT/JP2020/004117, mailed Mar. 31, 2020.

Written Opinion for corresponding Application No. PCT/JP2020/004117, mailed Mar. 31, 2020.

Office Action for corresponding European Application No. 20 777 231.0 dated May 15, 2025.

* cited by examiner (a)

(b)

BACK-SCATTERED ELECTRON IMAGE (POSITION 1)

BACK-SCATTERED ELECTRON IMAGE (POSITION 2)

BACK-SCATTERED ELECTRON IMAGE (POSITION 3)

BINARIZED DATA (POSITION 1)

BINARIZED DATA (POSITION 2)

BINARIZED DATA (POSITION 3)

COMPOSITE MEMBER, AND HEAT GENERATION DEVICE, BUILDING MEMBER AND LIGHT EMITTING DEVICE, EACH OF WHICH USES SAME

TECHNICAL FIELD

The present invention relates to a composite member, and a heat generation device, a building member, and a light emitting device each using the composite member.

BACKGROUND ART

Applying infrared absorbing ability to an inorganic member made from ceramics or glass has been performed to convert light energy of infrared rays into thermal energy.

Patent literature 1 discloses a heat-shielding and heat-generating translucent film material, which is a flexible sheet including a heat control layer. The heat control layer is a resin layer formed by a sea-island dispersion structure including a non-compatible mixture of a synthetic resin containing a thermochromic material and a synthetic resin containing a near-infrared absorbing material, and whose heat-shielding and heat-generating properties change with heat. Patent literature 1 further discloses a film roof structure having heat-shielding and heat-generating properties and translucency and using a heat-shielding and heat-generating translucent film material as a roof material. Constructing a film roof structure with a heat-shielding and heat-generating translucent film material can prevent internal dew condensation, sequentially control the snow accretion state on the roof in winter, and control the rise of internal temperature in summer.

Patent literature 2 discloses an infrared shielding filter including a transparent substrate, which is a glass substrate, and one or more infrared absorbing layers on at least one main surface side of the transparent substrate, wherein the infrared absorbing layer is a layer containing an organic pigment or inorganic particles in a transparent resin, or a layer composed of inorganic particles. As the organic pigment contained in the infrared absorbing layer, a diimonium compound is disclosed, and as the inorganic particles, particles such as ITO ($In_2O_3$—$SnO_2$-based), ATO ($Sb_2O_3$—$SnO_2$-based), lanthanum boride, sodium tungstate, potassium tungstate, rubidium tungstate, cesium tungstate, and the like are disclosed.

CITATION LIST

Patent Literature

Patent Literature 1: Japanese Unexamined Patent Application Publication No. 2012-140753

Patent Literature 2: International Publication No. WO 2014/168189

SUMMARY OF INVENTION

However, an infrared absorbing material is conventionally dispersed in a resin, which is a matrix, and thus the resin deteriorates due to long-term use. Further, when the infrared absorbing material is made from an organic substance, the infrared absorbing material also deteriorates due to the deterioration of the resin, so that the infrared absorbing ability declines. Furthermore, an infrared absorbing material made from inorganic particles, such as those in Patent literature 2, may have toxicity and is also very expensive as it contains rare metals and rare earth elements.

The present invention has been made in consideration of such issues as described above, which are inherent in related art. An object of the present invention is to provide a composite member that enhances the stability of an infrared absorbing material and maintains the infrared absorbing ability for a long time when an organic infrared absorbing material is used, and a heat generation device, a building member, and a light emitting device each using the composite member.

To solve the above-described issues, a composite member according to a first aspect of the present invention includes a matrix part including an inorganic substance, and an organic infrared absorbing material present in a dispersed state inside the matrix part, wherein the composite member has a porosity of 20% or less in a section of the matrix part.

A heat generation device according to a second aspect of the present invention includes the composite member according to the first aspect, and an infrared light source for irradiating the composite member with infrared rays.

A building member according to a third aspect of the present invention includes the composite member according to the first aspect, or the heat generation device according to the second aspect.

A light emitting device according to a fourth aspect of the present invention includes the composite member according to the first aspect, or the heat generation device according to the second aspect.

BRIEF DESCRIPTION OF DRAWINGS

FIG. 2(*b*) is a schematic sectional view of the vicinity of grain boundaries of a particle group of an inorganic substance.

DESCRIPTION OF EMBODIMENTS

Figure 1:
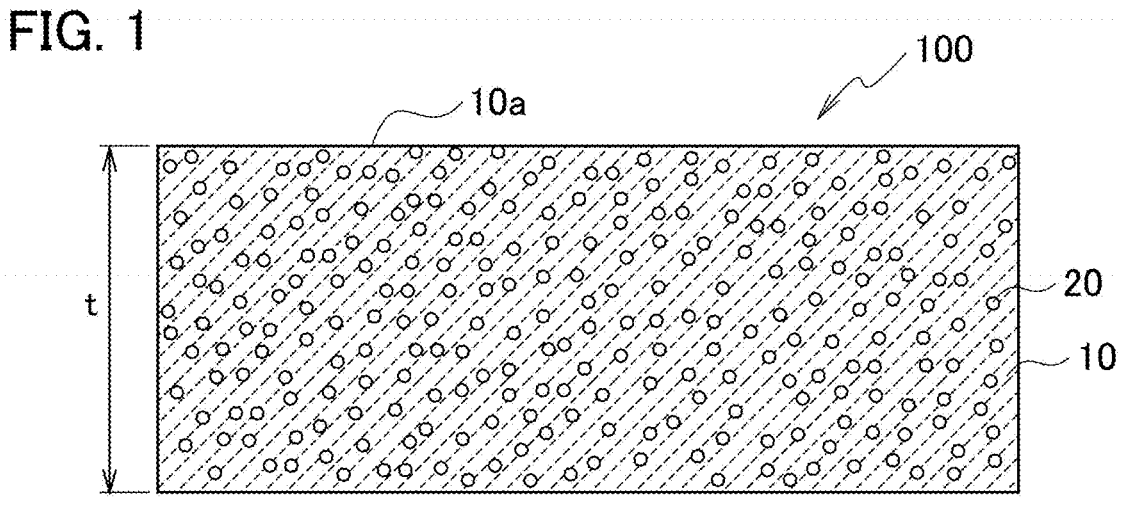
FIG. 1 is a schematic sectional view of an example of a composite member according to a first embodiment.

A detailed description is given below of a composite member according to the present embodiment, and a heat generation device, a building member, and a light emitting device each using the composite member. Note that dimensional ratios in the drawings are exaggerated for convenience of explanation and are sometimes different from actual ratios.

[Composite Member According to First Embodiment]

Figure 2:
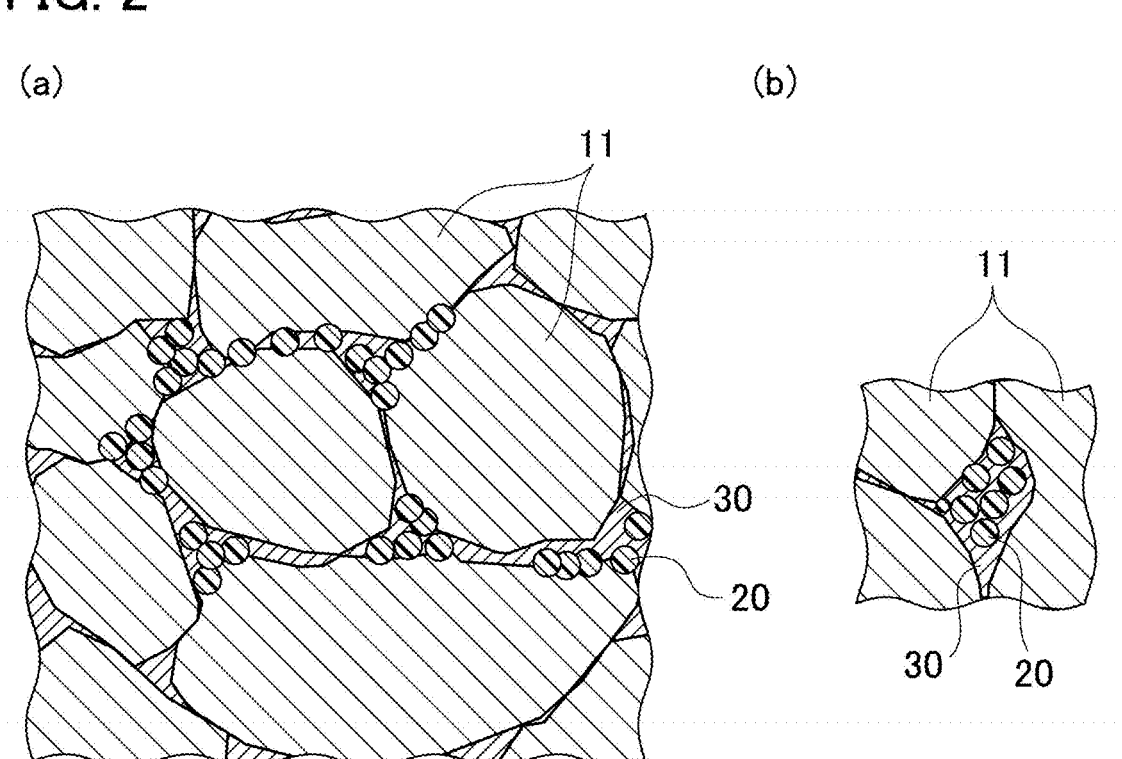
FIG. 2(*a*) is an enlarged schematic sectional view of the composite member according to the first embodiment.

As illustrated in FIG. 1, a composite member 100 according to the present embodiment includes a matrix part 10 made from an inorganic substance and an organic infrared absorbing material 20 present in a dispersed state within the matrix part 10. As illustrated in FIG. 2, the matrix part 10 includes multiple particles 11 made from the inorganic substance, and the particles 11 of the inorganic substance bond with each other to form the matrix part 10.

Preferably, the inorganic substance making up the matrix part 10 contains at least one metal element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among these, preferably, the inorganic substance contains at least one metal element selected from the group consisting of zinc, aluminum, and magnesium. As is described later, the inorganic substance containing the metal element described above can easily form a connection part derived from the inorganic substance by a pressure heating method.

Preferably, the inorganic substance contains at least one selected from the group consisting of an oxide, a nitride, a hydroxide, a sulfide, a boride, a carbide, and a halide of the above-described metal element. More preferably, the inorganic substance contains at least one selected from the group consisting of an oxide, a nitride, a hydroxide, a sulfide, a boride, a carbide, and a halide of the above-described metal element, as a main component. That is, preferably, the inorganic substance contains at least one selected from the group consisting of an oxide, a nitride, a hydroxide, a sulfide, a boride, a carbide, and a halide of the above-described metal element in an amount of 50 mol % or more, more preferably, in an amount of 80 mol % or more. Note that the oxide of the above-described metal element includes a phosphate, a silicate, an aluminate, and a borate in addition to a compound in which only oxygen is bonded to the metal element. Preferably, the inorganic substance is an oxide or a nitride of the above-described metal element. Such an inorganic substance has high stability against oxygen and water vapor in the atmosphere. Accordingly, dispersing the organic infrared absorbing material 20 inside the matrix part 10 prevents contact of the organic infrared absorbing material 20 with oxygen and water vapor and thus reduces deterioration of the organic infrared absorbing material 20.

Particularly preferably, the inorganic substance making up the matrix part 10 is an oxide. When the inorganic substance is made from an oxide of the above-described metal element, the composite member 100 with higher durability is obtained compared to each case of a fluoride and a nitride. Note that, preferably, the oxide of the metal element is a compound in which only oxygen is bonded to the metal element.

Preferably, the inorganic substance making up the matrix part 10 is a polycrystalline substance. That is, preferably, the particles 11 of the inorganic substance are crystalline particles, and preferably, the matrix part 10 is formed by aggregating a large number of particles 11. When the inorganic substance making up the matrix part 10 is a polycrystalline substance, the composite member 100 with higher durability is obtained compared to the case where the inorganic substance is made from an amorphous substance. Note that, more preferably, the particles 11 of the inorganic substance are crystalline particles containing at least one metal element selected from the group consisting of an alkali metal, an alkaline earth metal, a transition metal, a base metal, and a semimetal. Preferably, the particles 11 of the inorganic substance are crystalline particles containing at least one selected from the group consisting of an oxide, a nitride, a hydroxide, a sulfide, a boride, a carbide, and a halide of the above-described metal element. More preferably, the particles 11 of the inorganic substance are crystalline particles containing at least one selected from the group consisting of an oxide, a nitride, a hydroxide, a sulfide, a boride, a carbide, and a halide of the above-described metal element, as a main component.

Preferably, the inorganic substance making up the matrix part 10 is boehmite. Boehmite is an aluminum oxide hydroxide represented by a composition formula of AlOOH. Boehmite is insoluble in water and hardly reacts with acids and alkalis at room temperature, having high chemical stability. Boehmite also has excellent heat resistance due to its high dehydration temperature of around 500° C. Since boehmite has the specific gravity of about 3.07, when the matrix part 10 is made from boehmite, the composite member 100 that is lightweight and excellent in chemical stability is obtained.

When the inorganic substance making up the matrix part 10 is boehmite, the particles 11 may be particles only of a boehmite phase, or particles of a mixed phase of boehmite, and aluminum oxide or aluminum hydroxide other than boehmite For example, the particles 11 may be a mixture of a phase of boehmite and a phase of gibbsite (Al(OH)$_3$).

The average particle size of the particles 11 of the inorganic substance making up the matrix part 10 is not limited, but is more preferably 300 nm or more and 30 μm or less, still more preferably 300 nm or more and 10 μm or less, particularly preferably 300 nm or more and 5 μm or less. When the average particle size of the particles 11 of the inorganic substance is within this range, the particles 11 firmly bond with each other, increasing the strength of the matrix part 10. When the average particle size of the particles 11 of the inorganic substance is within this range, the percentage of pores present inside the matrix part 10 is 20% or less, which reduces the deterioration of the organic infrared absorbing material 20, as is described later. In this description, the value of "average particle size" is, unless otherwise stated, a value calculated as an average value of particle size of particles observed in several to several tens of visual fields by using observation means, such as a scanning electron microscope (SEM) or a transmission electron microscope (TEM).

The shape of the particles 11 of the inorganic substance is not limited, but may be spherical, for example. The particles 11 may be whisker-like (acicular) particles or scale-like particles. The whisker-like particles or the scale-like particles have higher contact with other particles compared to the spherical particles, which easily improves the strength of the matrix part 10. Therefore, using particles of such a shape for the particles 11 enhances the strength of the entire composite member 100. As the particles 11, which are whisker-like, for example, particles containing at least one selected from the group consisting of aluminum nitride (AlN), zinc oxide (ZnO), and aluminum oxide (Al₂O₃) can be used. As the particles 11, which are scale-like, particles containing boron nitride (BN) can be used.

Preferably, the inorganic substance making up the matrix part 10 has translucency. Specifically preferably, the inorganic substance transmits infrared rays. When the inorganic substance has translucency, the organic infrared absorbing material 20 easily absorbs infrared rays, and thus the composite member 100 is obtained in which light energy is easily converted into thermal energy by the organic infrared absorbing material 20.

Here, preferably, the inorganic substance making up the matrix part 10 does not substantially contain hydrates. In this description, "an inorganic substance does not substantially contain hydrates" means that the inorganic substance does not intentionally contain hydrates. Therefore, when a hydrate is incorporated into the inorganic substance as an unavoidable impurity, the condition "an inorganic substance does not substantially contain hydrates" is satisfied. Note that since boehmite is a metal oxide hydroxide, boehmite is not included in hydrates in this description.

Note that preferably, the inorganic substance making up the matrix part 10 does not contain a hydrate of a calcium compound. The calcium compound here is tricalcium silicate (alite, 3CaO·SiO₂), dicalcium silicate (belite, 2CaO·SiO₂), calcium aluminate (3CaO·Al₂O₃), calcium aluminoferrite (4CaO·Al₂O₃·Fe₂O₃), or calcium sulfate (CaSO₄·2H₂O). When the inorganic substance making up the matrix part 10 contains a hydrate of the above-described calcium compound, the composite member obtained may have a porosity in the section of the matrix part exceeding 20%. Thus, preferably, the inorganic substance does not contain the above-described hydrated calcium compound. Preferably, the inorganic substance making up the matrix part 10 does not contain phosphate cement, zinc phosphate cement, and calcium phosphate cement. When the inorganic substance does not contain these cements, the porosity of the composite member obtained is reduced to 20% or less.

Preferably, the organic infrared absorbing material 20 dispersed inside the matrix part 10 is a dye made from an organic compound and having a maximum absorption wavelength in the range of 780 nm to 1500. More preferably, the organic infrared absorbing material 20 is a dye having a maximum absorption wavelength in the range of 780 nm to 1000 nm. Such organic infrared absorbing material 20 converts light energy of the absorbed infrared rays into thermal energy.

The organic infrared absorbing material 20 is not limited as long as it exhibits properties described above. Preferably, the organic infrared absorbing material 20 is at least one selected from the group consisting of an azo metal complex, a triphenylamine azo dye, a cyanine dye, a squarylium dye, a phthalocyanine dye, a dithiolate complex dye, and a diimmonium salt dye.

Preferably, the matrix part 10 includes a group of particles of an inorganic substance in the composite member 100.

That is, preferably, the matrix part 10 includes the multiple particles 11 made from the inorganic substance, and the particles 11 of the inorganic substance bond with each other to form the matrix part 10. In this case, the particles 11 may be in point contact with each other, or in surface contact with each other by particle surfaces of the particles 11. Preferably, the organic infrared absorbing material 20 is present in an approximately uniformly dispersed state inside the matrix part 10. However, preferably, the organic infrared absorbing material 20 is present at grain boundaries of the particles 11 of the inorganic substance. As illustrated in FIG. 2, by unevenly distributing the organic infrared absorbing material 20 among adjacent inorganic particles 11, the composite member 100 is obtained that has a different color appearance compared to a state in which the organic infrared absorbing material 20 is approximately uniformly dispersed, when the organic infrared absorbing material 20 also has a coloring effect.

When the matrix part 10 includes the group of particles of the inorganic substance in the composite member 100, the organic infrared absorbing material 20 may be present among adjacent particles 11 of the inorganic substance. However, as illustrated in FIG. 2, in addition to the organic infrared absorbing material 20, there may be an amorphous part 30 containing an amorphous inorganic compound among the adjacent particles 11 of the inorganic substance. The presence of the amorphous part 30 allows the adjacent particles 11 of the inorganic substance to bond with each other via the amorphous part 30, further increasing the strength of the matrix part 10. Note that preferably, the amorphous part 30 is present to contact at least surfaces of the particles 11 of the inorganic substance. The amorphous part 30 may be present between the particles 11 of the inorganic substance and the organic infrared absorbing material 20 and among the adjacent organic infrared absorbing material 20 in addition to among the adjacent particles 11 of the inorganic substance.

Preferably, the amorphous part 30 contains an amorphous inorganic compound. Specifically, the amorphous part 30 may be a part made of only the amorphous inorganic compound or a mixture of the amorphous inorganic compound and a crystalline inorganic compound. The amorphous part 30 may be a part in which the crystalline inorganic compound is dispersed inside the amorphous inorganic compound. When the amorphous inorganic compound and the crystalline inorganic compound are mixed, the amorphous inorganic compound and the crystalline inorganic compound may have the same chemical composition or may have different chemical compositions from each other.

Preferably, the particles 11 of the inorganic substance and the amorphous part 30 contain the same metal element, and preferably, the metal element is at least one selected from the group consisting of an alkali metal, an alkaline earth metal, a transition metal, a base metal, and a semimetal. That is, preferably, the inorganic compound making up the particles 11 and the amorphous inorganic compound making up the amorphous part 30 contain at least the same metal element. The inorganic compound making up the particles 11 and the amorphous inorganic compound making up the amorphous part 30 may have the same chemical composition or may have different chemical compositions. Specifically, when the metal element is zinc, the inorganic compound making up the particles 11 and the amorphous inorganic compound making up the amorphous part 30 may both be zinc oxide (ZnO). Alternatively, while the inorganic compound making up the particles 11 is ZnO, the amorphous inorganic compound making up the amorphous part 30 may be a zinc-containing oxide other than ZnO.

In the composite member 100, preferably, the particles 11 and the amorphous part 30 contain an oxide of at least one metal element selected from the group consisting of an alkali metal, an alkaline earth metal, a transition metal, a base metal, and a semimetal. Since the oxide of such a metal element has high durability, contact of the organic infrared absorbing material 20 with oxygen and water vapor is prevented for a long time, and deterioration of the organic infrared absorbing material 20 is reduced.

Preferably, the oxide of the metal element contained in both the particles 11 and the amorphous part 30 is at least one selected from the group consisting of zinc oxide, magnesium oxide, and a composite of zinc oxide and magnesium oxide. As is described later, by using these oxides of the metal element, the amorphous part 30 is formed by a simple method.

In the composite member 100, the particles 11 and the amorphous part 30 may contain a nitride of at least one metal element selected from the group consisting of an alkali metal, an alkaline earth metal, a transition metal, a base metal, and a semimetal. Since the nitride of such a metal element also has high durability, contact of the organic infrared absorbing material 20 with oxygen and water vapor is prevented for a long time, and deterioration of the organic infrared absorbing material 20 is reduced. Examples of the nitride of the metal element contained in both the particles 11 and the amorphous part 30 include boron nitride (BN).

As described above, the inorganic substance making up the matrix part 10 may be boehmite In this case, the particles 11 of the matrix part 10 may be particles only of a boehmite phase, or particles of a mixed phase of boehmite, and aluminum oxide or aluminum hydroxide other than boehmite. In this case, preferably, the adjacent particles 11 are bonded through at least one of an oxide or an oxide hydroxide of aluminum. That is, preferably, the particles 11 are not bonded by an organic binder of an organic compound and are not also bonded by an inorganic binder of an inorganic compound except for an oxide and an oxide hydroxide of aluminum. Note that when the adjacent particles 11 are bonded through at least one of an oxide or an oxide hydroxide of aluminum, the oxide and the oxide hydroxide of aluminum may be crystalline, or amorphous.

Note that when the matrix part 10 is made from boehmite, the presence ratio of the boehmite phase is preferably 50% by mass or more, more preferably 60% by mass or more, still more preferably 70% by mass or more. By increasing the ratio of the boehmite phase, the matrix part 10 that is lightweight and excellent in chemical stability and heat resistance is obtained. Note that the ratio of the boehmite phase in the matrix part 10 is obtained by measuring the X-ray diffraction pattern of the matrix part 10 by an X-ray diffraction method and then performing a Rietveld analysis.

In the composite member 100, preferably, the porosity in the section of the matrix part 10 is 20% or less. That is, when the section of the matrix part 10 is observed, preferably, the average value of the percentage of pores per unit area is 20% or less. When the porosity is 20% or less, the organic infrared absorbing material 20 is sealed inside the dense inorganic substance. Thus, the ratio of the organic infrared absorbing material 20 contacting with oxygen and water vapor from the outside of the composite member 100 decreases, which reduces the oxidative decomposition of the organic infrared absorbing material 20 and maintains the infrared absorbing ability of the organic infrared absorbing material 20 for a long time. The porosity in the section of the matrix part 10 is preferably 15% or less, more preferably 10% or less, still more preferably 5% or less. As the porosity in the cross section of the matrix part 10 is smaller, the contact of the organic infrared absorbing material 20 with oxygen and water vapor is more prevented, which reduces the deterioration of the organic infrared absorbing material 20.

In this description, the porosity is determined as follows. First, the section of the matrix part 10 is observed to discriminate the matrix part 10, the organic infrared absorbing material 20, and the pores. Then, the unit area and the area of pores in that unit area are measured to obtain the ratio of pores per unit area. After the ratio of pores per unit area is obtained at multiple locations, the average value of the ratio of pores per unit area is taken as the porosity. Note that when the section of the matrix part 10 is observed, an optical microscope, a scanning electron microscope (SEM), or a transmission electron microscope (TEM) can be used. The unit area and the area of pores in that unit area may be measured by binarizing an image observed with a microscope.

The shape of the composite member 100 is not limited, but may be, for example, a plate shape. A thickness t of the composite member 100 (matrix part 10) is not limited, but may be, for example, 100 μm or more. The composite member 100 according to the present embodiment is formed by a pressure heating method, as described later. Thus, the composite member 100 having a large thickness is easily obtained. The thickness t of the composite member 100 (matrix part 10) may be 0.5 mm or more. The thickness t of the composite member 100 (matrix part 10) may be 1 cm or more. The upper limit of the thickness t of the composite member 100 (matrix part 10) is not limited, but may be, for example, 50 cm.

Figure 3:
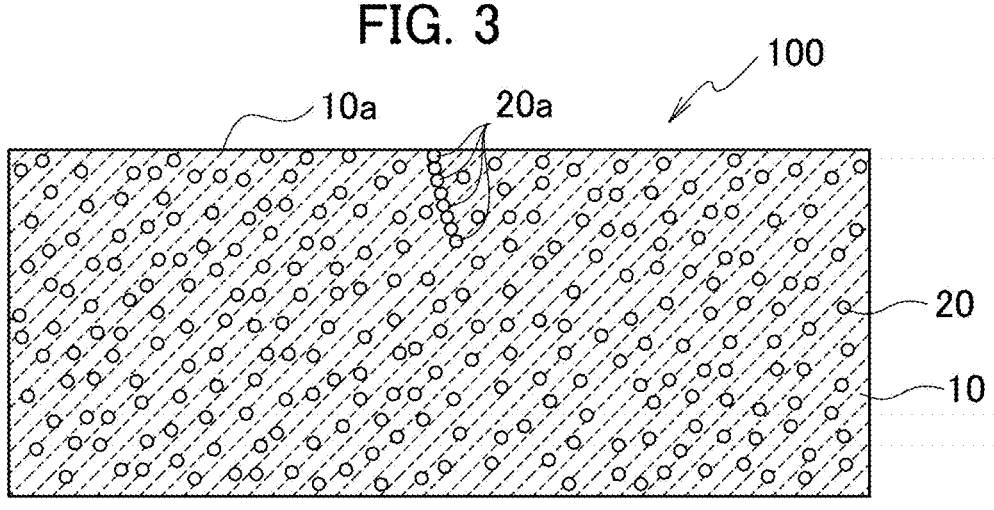
FIG. 3 is a schematic sectional view of another example of the composite member according to the first embodiment.

In the composite member 100, preferably, the organic infrared absorbing material 20 is not continuously present from a surface 10a of the matrix part 10 to the inside of the matrix part 10 and is not present in the form of a film on the surface 10a of the matrix part 10. Specifically, preferably, the organic infrared absorbing material 20 is present in a dispersed state inside the matrix part 10. A part of the organic infrared absorbing material 20 may be segregated inside the matrix part 10. However, preferably, an organic infrared absorbing material 20a segregated is not continuously present from the surface 10a to the inside of the matrix part 10 as illustrated in FIG. 3. The organic infrared absorbing material 20a present on the surface 10a of the matrix part 10 may deteriorate by contact with oxygen and water vapor in the atmosphere. The organic infrared absorbing material 20a continuously present from the surface 10a to the inside of the matrix part 10 may also deteriorate due to the oxidative deterioration of the organic infrared absorbing material 20a present on the surface 10a. Therefore, from the viewpoint of reducing the deterioration of the organic infrared absorbing material 20, preferably, the organic infrared absorbing material 20 is not continuously present from the surface 10a to the inside of the matrix part 10.

With respect to the organic infrared absorbing material 20 dispersed in the matrix part 10, preferably, a part of the organic infrared absorbing material 20 is not present in a film shape on the surface 10a of the matrix part 10. In this case, the organic infrared absorbing material 20 in a film shape may oxidize and deteriorate due to exposure to oxygen and water vapor in the atmosphere.

Figure 4:
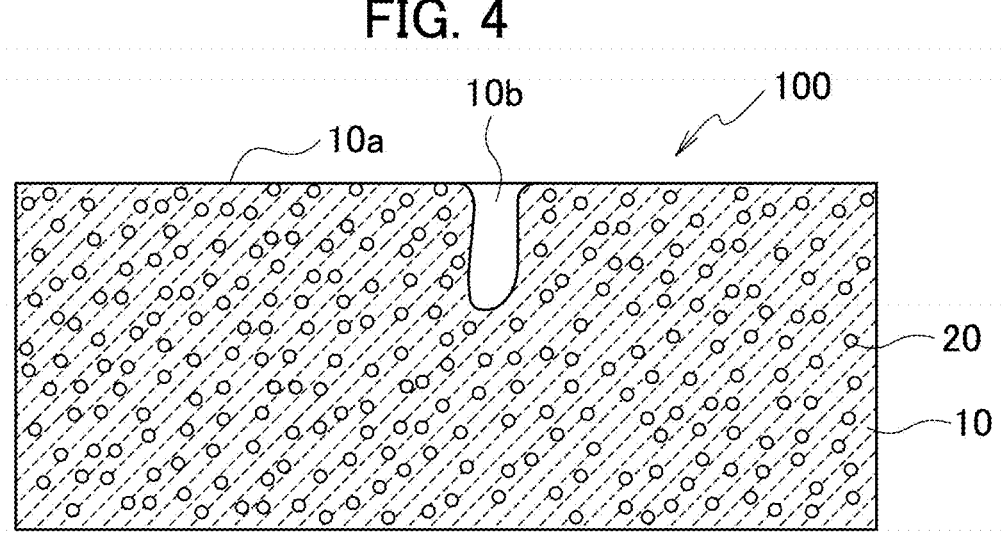
FIG. 4 is a schematic sectional view of another example of the composite member according to the first embodiment.

In the composite member 100, preferably, the matrix part 10 has no gap 10b communicating from the surface 10a to the inside of the matrix part 10. The organic infrared absorbing material 20 inside the matrix part 10 is covered with the particles 11 of the inorganic substance and thus hardly oxidizes and deteriorates. However, as illustrated in FIG. 4, when the gap 10b is present in the matrix part 10, oxygen and water vapor may reach the inside of the matrix part 10 through the gap 10b and may contact with the organic infrared absorbing material 20 inside the matrix part 10. Thus, from the viewpoint of reducing the oxidative deterioration of the organic infrared absorbing material 20, preferably, the matrix part 10 does not have the gap 10b communicating from the surface 10a to the inside.

As described above, the composite member 100 according to the present embodiment includes the matrix part 10 made from an inorganic substance and the organic infrared absorbing material 20 present in a dispersed state inside the matrix part 10, and the porosity in the section of the matrix part 10 is 20% or less. The composite member 100 using the organic infrared absorbing material can solve issues of toxicity and price caused by inorganic infrared absorbing materials. Since the organic infrared absorbing material 20 is highly dispersed in the matrix part 10, the entire composite member 100 absorbs infrared rays and generates heat. Thus, when the composite member 100 is processed, the infrared absorbing ability of the composite member 100 is maintained. In contrast, in the case of the infrared absorbing layer provided on the surface of the transparent substrate as in Patent literature 2, surface processing is not possible because the infrared absorbing layer is removed when the surface is processed.

The composite member 100 has the porosity of 20% or less in the section. Thus, the ratio of the organic infrared absorbing material 20 contacting with oxygen and water vapor decreases, which reduces the oxidative decomposition of the organic infrared absorbing material 20 and maintains the infrared absorbing ability of the composite member 100 for a long time. Since the matrix part 10 has few internal pores and the inorganic substance is dense, the composite member 100 is a ceramic member having high strength.

As described above, the heat-shielding and heat-generating translucent film material of Patent literature 1 has a heat control layer, and the heat control layer is made from a non-compatible mixture of a synthetic resin containing a thermochromic material and a synthetic resin containing a near-infrared absorbing material. The infrared shielding filter of Patent literature 2 has an infrared absorbing layer, and the infrared absorbing layer is a layer containing an organic pigment or inorganic particles in a transparent resin. As in Patent literatures 1 and 2, when the infrared absorbing material is dispersed in a resin, which is a matrix, the infrared absorbing material absorbs infrared rays and converts them into thermal energy. However, since resins generally have low thermal conductivity, the thermal energy generated may not be effectively utilized. In contrast, the matrix part 10 of the composite member 100 is made from inorganic substance and thus has high thermal conductivity. Therefore, the thermal energy generated is efficiently conducted to the surface 10a of the matrix part 10 to be effectively utilized.

The infrared shielding filter of Patent literature 2 is provided with an infrared absorbing layer using a transparent resin as a matrix on the surface of a transparent substrate, which is a glass substrate. Thus, the infrared absorbing layer may be peeled off due to the difference in thermal expansion coefficient between the transparent substrate and the infrared absorbing layer. However, the composite member 100 has the organic infrared absorbing material 20 highly dispersed in the matrix part 10, having no peeling issue and maintaining high stability for a long time.

Next, a method for manufacturing the composite member 100 according to the present embodiment is described. The composite member 100 is manufactured by pressurizing and heating a mixture of particles of an inorganic substance and an organic infrared absorbing material in a state containing a solvent. By using such a pressure heating method, a part of the inorganic substance is eluted, and the inorganic substance is bonded to each other, forming the matrix part 10 with the organic infrared absorbing material 20 dispersed therein.

Specifically, first, an inorganic substance powder and an organic infrared absorbing material powder are mixed to prepare a mixed powder. The method for mixing the inorganic substance powder and the organic infrared absorbing material powder is not limited and may be carried out by a dry or wet process. The inorganic substance powder and the organic infrared absorbing material powder may be mixed in air or in an inert atmosphere.

Next, a solvent is added to the mixed powder. The solvent is not limited, but for example, one dissolving a part of the inorganic substance when the mixed powder is pressurized and heated can be used. As the solvent, one reacting with the inorganic substance to form another inorganic substance different from said inorganic substance can be used. As such a solvent, at least one selected from the group consisting of an acidic aqueous solution, an alkaline aqueous solution, water, an alcohol, a ketone, and an ester can be used. As the acidic aqueous solution, an aqueous solution with a pH of 1 to 3 can be used. As the alkaline aqueous solution, an aqueous solution with a pH of 10 to 14 can be used. As the acidic aqueous solution, preferably, an aqueous solution of an organic acid is used. As the alcohol, preferably, an alcohol with 1 to 12 carbon atoms is used.

The mixture containing the inorganic substance, the organic infrared absorbing material, and the solvent is prepared by mixing the inorganic substance powder and the organic infrared absorbing material powder, and then adding the solvent, as described above. However, a method for preparing the mixture containing the inorganic substance, the organic infrared absorbing material, and the solvent is not limited to such a method. The method for preparing the mixture includes first mixing the organic infrared absorbing material and the solvent. In this case, the organic infrared absorbing material may or may not be dissolved in the solvent. Then, by adding the inorganic substance powder to the mixture of the organic infrared absorbing material and the solvent, the mixture containing the inorganic substance, the organic infrared absorbing material, and the solvent may be prepared.

The mixture containing the inorganic substance, the organic infrared absorbing material, and the solvent is then filled inside the mold. After filling the mold with the mixture, the mold may be heated as necessary. Then, by applying pressure to the mixture inside the mold, the inside of the mold becomes a high pressure state. At this time, the inorganic substance and the organic infrared absorbing material are densified, and at the same time, particles of the inorganic substance bond with each other.

When a solvent that dissolves a part of an inorganic substance is used, an inorganic compound making up the inorganic substance is dissolved in the solvent under high pressure. The inorganic compound dissolved penetrates a gap between the inorganic substance and the organic infrared absorbing material, a gap among the inorganic substance, and a gap among the organic infrared absorbing material. Then, the solvent in the mixture is removed in this state to form a connection part derived from the inorganic substance between the inorganic substance and the organic infrared absorbing material, among the inorganic substance, and among the organic infrared absorbing material. When a solvent that reacts with an inorganic substance to form another inorganic substance different from said inorganic substance is used, an inorganic compound making up the inorganic substance reacts with the solvent under high pressure. Then, the other inorganic substance generated by the reaction is filled in the gap between the inorganic substance and the organic infrared absorbing material, the gap among the inorganic substance, and the gap among the organic infrared absorbing material to form a connection part derived from the other inorganic substance.

When a solvent that dissolves a part of an inorganic substance is used, heating and pressurizing conditions of the mixture containing the inorganic substance, the organic infrared absorbing material, and the solvent are not limited as long as the conditions are such that dissolution of the surface of the inorganic substance progresses. When a solvent that reacts with an inorganic substance to form another inorganic substance different from said inorganic substance is used, heating and pressurizing conditions of the mixture are not limited as long as the reaction between the inorganic substance and the solvent proceeds. For example, preferably, the mixture containing the inorganic substance, the organic infrared absorbing material, and the solvent is heated to 50 to 300° C. and then pressurized at a pressure of 10 to 600 MPa. Note that the temperature at which the mixture containing the inorganic substance, the organic infrared absorbing material, and the solvent is heated is more preferably 80 to 250° C., still more preferably 100 to 200° C. The pressure at which the mixture containing the inorganic substance, the organic infrared absorbing material, and the solvent is pressurized is more preferably 50 to 400 MPa, more preferably 50 to 200 MPa.

Then, by taking out the molded body from the inside of the mold, the composite member 100 is obtained. Note that, preferably, the connection part derived from the inorganic substance formed between the inorganic substance and the organic infrared absorbing material, among the inorganic substance, and among the organic infrared absorbing material is the amorphous part 30 described above.

As a method for producing an inorganic member made from a ceramic, a sintering method has been known. The sintering method is a method for obtaining a sintered body by heating an aggregate of a solid powder made from an inorganic substance at a temperature lower than the melting point. However, in the sintering method, the solid powder is heated to 1000° C. or higher, for example. Therefore, when the sintering method is used to obtain a composite member made from the inorganic substance and the organic infrared absorbing material, the organic infrared absorbing material carbonizes due to heating at a high temperature, obtaining no composite member. However, in the manufacturing method for the composite member 100 according to the present embodiment, the mixture formed by mixing the inorganic substance powder and the organic infrared absorbing material powder is heated at a low temperature of 300° C. or less, and thus the organic infrared absorbing material hardly carbonizes. This enables the organic infrared absorbing material 20 to be stably dispersed inside the matrix part 10 made from the inorganic substance.

Further, in the manufacturing method according to the present embodiment, since the mixture of the inorganic substance powder and the organic infrared absorbing material powder is pressurized while being heated, the inorganic substance is aggregated to form the matrix part 10 that is dense. As a result, the number of pores inside the matrix part 10 is reduced, and thus the composite member 100 is obtained that has high strength while reducing the oxidative deterioration of the organic infrared absorbing material 20.

Next, a method for manufacturing the composite member 100 is described in which the inorganic substance making up the matrix part 10 is boehmite. The composite member in which the inorganic substance is boehmite is produced by mixing a hydraulic alumina, an organic infrared absorbing material, and a solvent containing water, and then pressurizing and heating the mixture. The hydraulic alumina is an oxide obtained by heat-treating aluminum hydroxide and contains ρ alumina. Such hydraulic alumina has the property of bonding and curing by hydration reaction. Therefore, by using the pressure heating method, the hydration reaction of the hydraulic alumina progresses to have the hydraulic alumina bonded to each other while the crystal structure is changed to boehmite, so that the matrix part 10 is formed.

Specifically, a hydraulic alumina powder, an organic infrared absorbing material, and a solvent containing water are first mixed to prepare a mixture. Preferably, the solvent containing water is pure water or ion exchange water. However, the solvent containing water may contain an acidic substance or an alkaline substance, in addition to water. As long as the solvent containing water contains water as a main component, the solvent containing water may contain, for example, an organic solvent (for example, an alcohol).

Preferably, the amount of the solvent added to the hydraulic alumina is an amount in which the hydration reaction of the hydraulic alumina sufficiently progresses. The amount of the solvent added is preferably 20 to 200% by mass to the hydraulic alumina, more preferably 50 to 150% by mass to the hydraulic alumina.

Next, the mixture formed by mixing the hydraulic alumina, the organic infrared absorbing material, and the solvent containing water is filled inside the mold. After filling the mold with the mixture, the mold may be heated as necessary. By applying pressure to the mixture inside the mold, the inside of the mold becomes a high pressure state. At this time, the hydraulic alumina becomes highly filled, and particles of the hydraulic alumina bond with each other, resulting in high density. Specifically, by adding water to the hydraulic alumina, the hydraulic alumina undergoes a hydration reaction to form boehmite and aluminum hydroxide on the surface of particles of the hydraulic alumina. By pressurizing the mixture in the mold while heating, the boehmite and aluminum hydroxide generated mutually diffuse among adjacent hydraulic alumina particles, so that the hydraulic alumina particles gradually bond with each other. Then, the dehydration reaction proceeds by heating, and the crystal structure changes from aluminum hydroxide to boehmite. It is supposed that the hydration reaction of the hydraulic alumina, the mutual diffusion among the hydraulic alumina particles, and the dehydration reaction proceed almost simultaneously.

When the molded body is taken out from the inside of the mold, the composite member is obtained in which the particles 11 bond with each other via at least one of the oxide or the oxide hydroxide of aluminum, and further the organic infrared absorbing material is dispersed.

Heating and pressurizing conditions of the mixture formed by mixing the hydraulic alumina, the organic infrared absorbing material, and the solvent containing water are not limited as long as the reaction between the hydraulic alumina and the solvent progresses. For example, preferably, the mixture formed by mixing the hydraulic alumina, the organic infrared absorbing material, and the solvent containing water is pressurized at a pressure of 10 to 600 MPa while being heated to 50 to 300° C. Note that the temperature at which the mixture formed by mixing the hydraulic alumina, the organic infrared absorbing material, and the solvent containing water is heated is more preferably 80 to 250° C., still more preferably 100 to 200° C. The pressure at which the mixture formed by mixing the hydraulic alumina, the organic infrared absorbing material, and the solvent containing water is pressurized is more preferably 50 to 600 MPa, still more preferably 200 to 600 MPa.

As described above, the method for producing the composite member 100 includes: a step of mixing an inorganic substance powder with an organic infrared absorbing material powder to obtain a mixture; and a step of adding a solvent dissolving an inorganic substance or a solvent reacting with the inorganic substance to the mixture, and then pressurizing and heating the mixture. Alternatively, the method for producing the composite member 100 includes: a step of mixing an organic infrared absorbing material with a solvent dissolving an inorganic substance or a solvent reacting with the inorganic substance; a step of mixing an inorganic substance powder with the solvent containing the organic infrared absorbing material to obtain a mixture; and a step of pressurizing and heating the mixture. Preferably, heating and pressurizing conditions of the mixture are a temperature of 50 to 300° C. and a pressure of 10 to 600 MPa. In the manufacturing method according to the present embodiment, since the composite member 100 is formed under such a low temperature condition, carbonization of the organic infrared absorbing material 20 is reduced so that a ceramic member excellent in infrared absorbing ability is obtained.

The method for producing the composite member 100 in which the inorganic substance is boehmite includes: a step of mixing the hydraulic alumina, the organic infrared absorbing material 20, and the solvent containing water to obtain the mixture; and a step of pressurizing and heating the mixture. Preferably, heating and pressurizing conditions of the mixture are a temperature of 50 to 300° C. and a pressure of 10 to 600 MPa. In this manufacturing method, the composite member is formed under such a low temperature condition, and thus the obtained member is mainly made from boehmite phase. Therefore, the composite member that is lightweight and excellent in chemical stability is obtained by a simple method.

[Composite Member According to Second Embodiment]

Next, a composite member according to a second embodiment is described in detail with reference to the drawings. The same components as those in the first embodiment are denoted by the same reference numerals, and redundant description is omitted.

Figure 5:
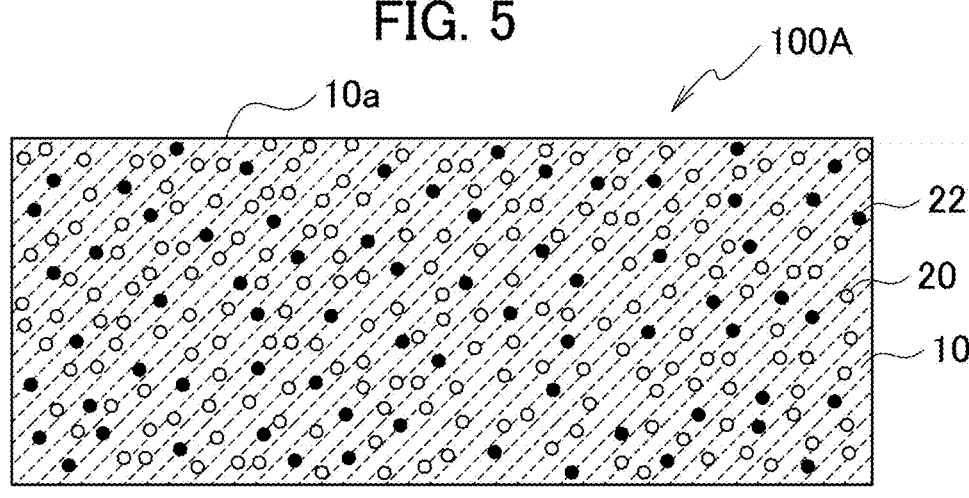
FIG. 5 is a schematic sectional view of an example of a composite member according to a second embodiment.

Similar to the first embodiment, a composite member 100A according to the present embodiment includes a matrix part 10 made from an inorganic substance and an organic infrared absorbing material 20 present in a dispersed state within the matrix part 10. The matrix part 10 includes multiple particles 11 made from the inorganic substance, and the particles 11 of the inorganic substance bond with each other to form the matrix part 10. The composite member 100A further includes an organic thermochromic material 22 present within the matrix part 10. Specifically, as illustrated in FIG. 5, the composite member 100A has both the organic infrared absorbing material 20 and the organic thermochromic material 22 present in a dispersed state within the matrix part 10.

The organic thermochromic material 22 is made from an organic compound and is a dye that changes color at a specific temperature. That is, the organic thermochromic material 22 is a compound whose chemical structure changes under the action of heat. For example, it exhibits a reversible change from colorless to colored by heating and then back to colorless by cooling. Note that the organic thermochromic material 22 may exhibit a reversible change from colored to colorless by heating and then back to colored by cooling. The organic thermochromic material 22 may exhibit a property of reflecting or transmitting infrared rays at high temperature and a property of absorbing infrared rays at low temperature. When the absorption wavelength of light of the organic thermochromic material 22 is only in the infrared region, there is no change in color, and only the absorption intensity of infrared rays changes with temperature.

The organic thermochromic material 22 is not limited as long as it exhibits the properties described above. Preferably, the organic thermochromic material 22 is at least one selected from the group consisting of a bianthrone dye, a spirooxazine dye, a spiropyran dye, and a salicylideneaniline dye. The organic thermochromic material 22 may be in the form of a microcapsule. Preferably, the organic thermochromic material 22 is a microcapsule including a coloring agent and a developer. In this case, preferably, a leuco dye is used as the coloring agent. In particular, preferably, the leuco dye is a compound having a lactone ring. As the organic thermochromic material 22, for example, TC-PN29 is mentioned that is a thermosensitive material manufactured by SAKURA COLOR PRODUCTS CORPORATION. The thermosensitive material changes to blue at room temperature (20° C.) and to colorless at 29° C. or more.

In the composite member 100A according to the present embodiment, as in the first embodiment, both of the organic infrared absorbing material 20 and the organic thermochromic material 22 are each present in a dispersed state within the matrix part 10. Thus, the contact rate of oxygen and water vapor with the organic infrared absorbing material 20 and the organic thermochromic material 22 reduces, thereby reducing oxidative decomposition of the organic infrared absorbing material 20 and the organic thermochromic material 22.

In the composite member 100A, preferably, the organic thermochromic material 22 is colored at room temperature (20° C.) to exhibit a property of absorbing visible light and/or infrared rays and is colorless to exhibit a property of reflecting visible light and/or infrared rays at 30° C. or higher. When such composite member 100A is used in summer when the temperature is high, the organic thermochromic material 22 is heated and reflects visible light and/or infrared rays, so that the organic infrared absorbing material 20 hardly absorbs infrared rays. Therefore, the organic infrared absorbing material 20 hardly converts light energy into thermal energy, and further temperature rise of the composite member 100A is controlled. In contrast, when such composite member 100A is used in winter when the temperature is low, the organic thermochromic material 22 is cooled and absorbs visible light and/or infrared rays. In this case, the organic infrared absorbing material 20 also absorbs infrared rays. Therefore, the organic infrared absorbing material 20 converts light energy into thermal energy, and the temperature rise of the composite member 100A is promoted.

As illustrated in FIG. 5, the composite member 100A according to the present embodiment may have the organic infrared absorbing material 20 and the organic thermochromic material 22 each present in a substantially uniformly dispersed state within the matrix part 10. However, the present embodiment is not limited to this mode, and for example, the organic thermochromic material 22 may be segregated near the surface of the matrix part 10. Specifically, as illustrated in FIG. 6, within the matrix part 10, the organic thermochromic material 22 may be closer to a side of the surface 10a that is irradiated with infrared rays, compared with the organic infrared absorbing material 20 within the matrix part 10.

Figure 6:
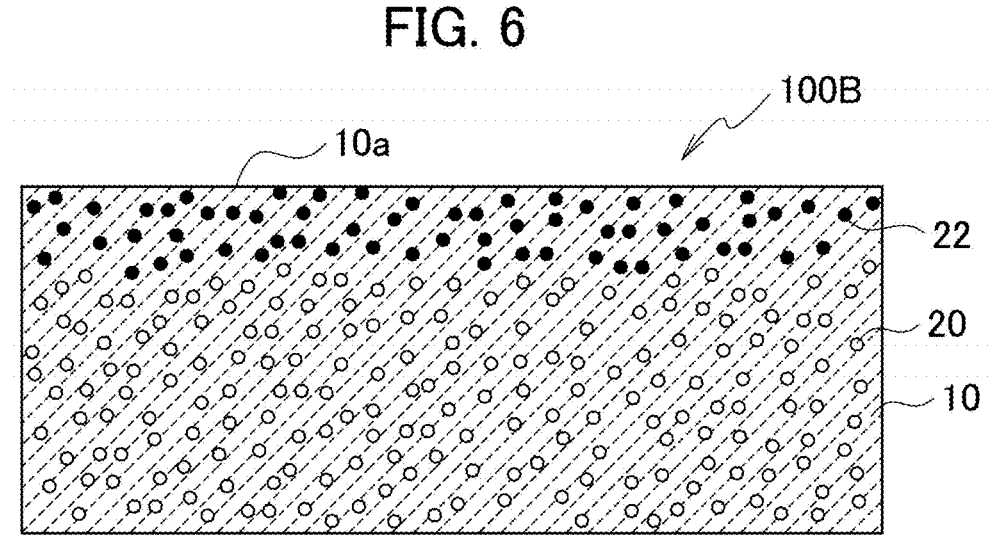
FIG. 6 is a schematic sectional view of another example of the composite member according to the second embodiment.

In a composite member 100B illustrated in FIG. 6, similarly to the composite member 100A, when the ambient temperature is high, the organic thermochromic material 22 is heated and reflects visible light and/or infrared rays, so that the organic infrared absorbing material 20 hardly absorbs infrared rays. In contrast, when the ambient temperature is low, the organic thermochromic material 22 is cooled and absorbs visible light and/or infrared rays, and the organic infrared absorbing material 20 also absorbs infrared rays. As illustrated in FIG. 6, in the case of the organic thermochromic material 22 segregated in the vicinity of the surface 10a of the matrix part 10, when the ambient temperature is high, the organic thermochromic material 22 efficiently reflects visible light and/or infrared rays. Therefore, in the composite member 100B, infrared rays are less likely to reach the organic infrared absorbing material 20 than in the composite member 100A, so that the temperature rise of the composite member 100B is further controlled. In contrast, in the case of the organic thermochromic material 22 segregated in the vicinity of the surface 10a of the matrix part 10, when the ambient temperature is low, the organic thermochromic material 22 absorbs visible light and/or infrared rays while the organic infrared absorbing material 20 also absorbs infrared rays. Therefore, the composite member 100B accelerates the temperature rise in the same way as the composite member 100A.

Thus, the composite members 100A, 100B each include the matrix part 10 made from an inorganic substance, the organic infrared absorbing material 20 present in a dispersed state within the matrix part, and the organic thermochromic material 22 present within the matrix part. The composite members 100A, 100B each have a porosity of 20% or less in the cross section of the matrix part 10. In the composite members 100A, 100B, the organic infrared absorbing material 20 and the organic thermochromic material 22 coexist within the matrix part 10. As a result, the composite member 100A switches between light reflection and light absorption at high temperature and low temperature. Thus, the composite member 100A prevents further temperature rise when the ambient temperature is high and accelerates temperature rise when the ambient temperature is low. Therefore, when the composite members 100A and 100B are used, for example, as the outer wall material of a house, the temperature rise of the outer wall material is reduced in summer, and the temperature rise is accelerated in winter, so that the heating and cooling efficiency is enhanced.

Next, a method for manufacturing the composite member 100A according to the present embodiment is described. Similar to the first embodiment, the composite member 100A is manufactured by pressurizing and heating a mixture of particles of an inorganic substance, an organic infrared absorbing material, and an organic thermochromic material in a state containing a solvent.

Specifically, first, an inorganic substance powder, an organic infrared absorbing material powder, and an organic thermochromic material powder are mixed to prepare a mixed powder. The mixing method of these powders is not limited, and the mixing atmosphere is not limited.

Next, a solvent is added to the mixed powder. The solvent described in the first embodiment may be used, and the method for adding the solvent may be the same as in the first embodiment. Next, the mixture containing the inorganic substance, the organic infrared absorbing material, the organic thermochromic material, and the solvent is filled inside the mold, and then heated and pressurized. Heating and pressurizing conditions of the mixture may be the same as those of the first embodiment. Then, by taking out the molded body from the inside of the mold, the composite member 100A is obtained.

Next, a method for manufacturing the composite member 100B according to the present embodiment is described. For the composite member 100B, an inorganic substance powder and an organic infrared absorbing material powder is mixed to prepare a first mixed powder. Further, an inorganic substance powder and an organic thermochromic material powder are mixed to prepare a second mixed powder.

Then, a solvent is added to both of the first and second mixed powders. A first mixture containing the first mixed powder and the solvent is filled inside the mold, and then a second mixture containing the second mixed powder and the solvent is filled inside the mold. Thus, the first mixture and the second mixture are stacked within the mold. In this state, the first mixture and the second mixture are simultaneously heated and pressurized. Heating and pressurizing conditions of the first mixture and the second mixture may be the same as those of the first embodiment. Then, by taking out the molded body from the inside of the mold, the composite member 100B is obtained.

[Heat Generation Device]

Next, a heat generation device according to the present embodiment is described in detail with reference to the drawings. The same components as those of the composite member according to the first embodiment and the composite member according to the second embodiment are denoted by the same reference numerals, and redundant description is omitted.

Figure 7:
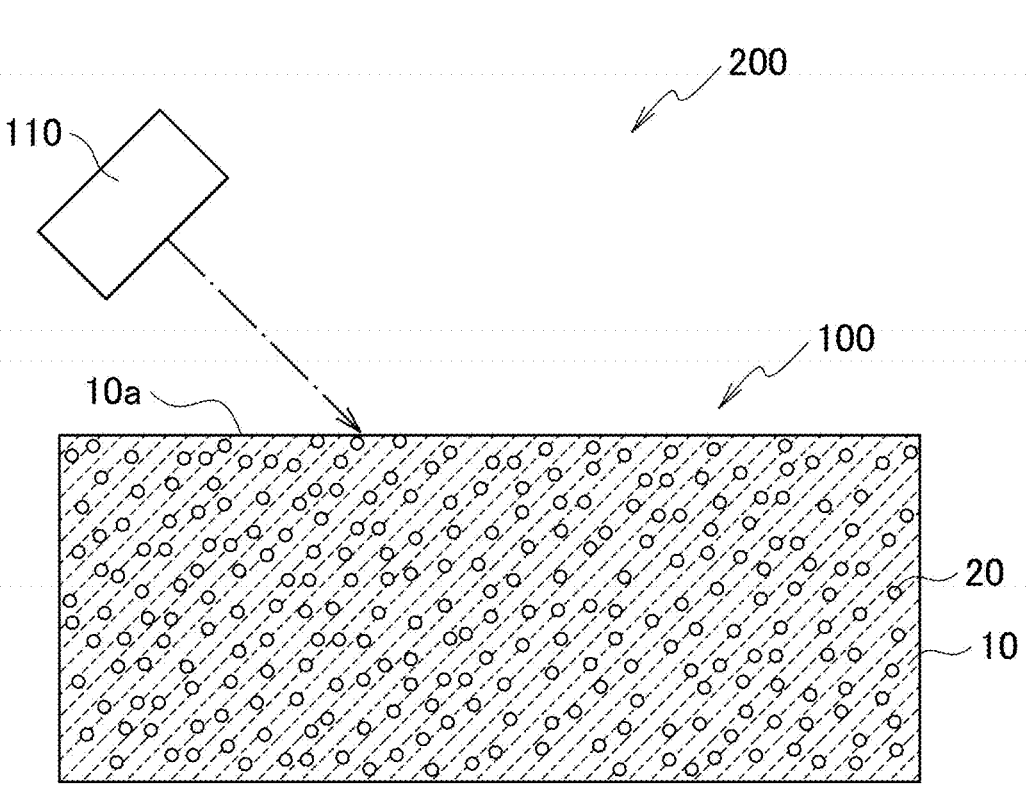
FIG. 7 is a schematic view of an example of a heat generation device according to the present embodiment.

As illustrated in FIG. 7, a heat generation device 200 according to the present embodiment includes the composite member 100 (100A, 100B) and an infrared light source 110 for irradiating the composite member 100 with infrared rays. As described above, the composite member 100 has the organic infrared absorbing material 20 present in a dispersed state within the matrix part 10, and the organic infrared absorbing material 20 absorbs infrared rays and converts light energy into thermal energy. Since the matrix part 10 is made from the inorganic substance, the thermal energy generated by the organic infrared absorbing material 20 is efficiently conducted to the surface 10a of the matrix part 10.

The infrared light source 110 emits infrared rays. The infrared light source 110 is not limited, but for example, a light emitting diode or a laser diode emitting near infrared rays may be used. Preferably, the infrared rays emitted from the infrared light source 110 has a maximum intensity within a wavelength range of 780 nm to 1500 nm. This enables the organic infrared absorbing material 20 to efficiently absorb infrared rays and generate heat.

As illustrated in FIG. 7, in the heat generation device 200, infrared rays emitted from the infrared light source 110 are emitted onto the surface 10a of the composite member 100. The infrared rays emitted on the surface 10a pass through the matrix part 10 to reach the organic infrared absorbing material 20. Then, the organic infrared absorbing material 20 absorbs infrared rays to generate heat. The thermal energy generated in the organic infrared absorbing material 20 is conducted to the surface 10a by the matrix part 10 with high thermal conductivity. When the irradiation with infrared rays by the infrared light source 110 is stopped, the organic infrared absorbing material 20 no longer generates heat, so that the composite member 100 returns to room temperature.

As described above, in the heat generation device 200 according to the present embodiment, the composite member 100 generates heat by infrared radiation using the infrared light source 110, and the composite member 100 returns to room temperature by stopping the infrared radiation. Therefore, heat generation of the composite member 100 is controllable by the simple method of infrared radiation. Since the organic infrared absorbing material 20 within the composite member 100 has high durability, the heat generation device 200 generates heat for a long time.

[Building Member and Light Emitting Device]

Next, a building member and a light emitting device according to the present embodiment are described.

The building member according to the present embodiment includes the composite member 100 described above. The building member is a member manufactured for construction, in which the composite member 100 is used at least partially in the present embodiment. As described above, the composite member 100 can be formed in a plate shape having a large thickness, and is excellent in scratch resistance in addition to high strength and durability. The composite member 100 is cuttable in the same manner as a general ceramic member and maintains the infrared absorbing ability derived from the organic infrared absorbing material 20 when the surface is processed. Therefore, the composite member 100 is suitably usable as a building member. The building member is not limited, but for example, an exterior wall material (siding), a roof material, and the like are mentioned. Materials for roads and materials for outer grooves are also mentioned as the building member.

As described above, the composite member 100 has a function of absorbing infrared rays to generate heat. Therefore, when the building member according to the present embodiment is irradiated with sunlight including infrared rays, the building member exhibits an effect of accelerating snow melting and further reducing freezing. Furthermore, the building member absorbs infrared rays, thereby shielding the infrared rays. Therefore, when the building member is used as the exterior wall material or the roof material for example, the rise in room temperature inside the building is controlled.

The light emitting device according to the present embodiment includes the above-described composite member 100. As the light emitting device according to the present embodiment, a device used outdoors is mentioned. Specifically, examples of the light emitting device include a lamp, such as a security light and a street light, and a signal.

As described above, the composite member 100 has a function of absorbing infrared rays to generate heat. Thus, using the composite member 100 in the light emitting device according to the present embodiment accelerates the melting of snow attached to the light emitting device and further reduces the freezing of the light emitting device. The composite member 100 has high strength while being easily processible and thus is usable as a cover, a post, or the like of the light emitting device.

The building member according to the present embodiment is not limited to the composite member 100 according to the first embodiment and may include the composite member 100A or the composite member 100B according to the second embodiment. The building member may include the heat generation device 200. Similarly, the light emitting device according to the present embodiment is not limited to the composite member 100 according to the first embodiment and may include the composite member 100A or the composite member 100B according to the second embodiment. The light emitting device may include the heat generation device 200.

EXAMPLES

The composite member according to the present embodiment is described in more detail with reference to an example and a reference example below, but the present embodiment is not limited thereto.

Example and Comparative Example (Preparation of Test Sample)

Example

White zinc oxide particles having an average particle size $D_{50}$ of about 1 μm (manufactured by Kojundo Chemical Laboratory Co.,Ltd., purity 99.99%) were used as the inorganic particles. A phthalocyanine material (Near-infrared absorbing phthalocyanine TX-HA-7250P, manufactured by NIPPON SHOKUBAI CO., LTD.) was used as the organic infrared absorbing material. Then, 0.75 g (90% by volume) of the zinc oxide particles and 0.02515 g (10% by volume) of the organic infrared absorbing material were wet-mixed with acetone using a mortar and pestle made of agate to obtain a mixed powder.

Next, the mixed powder obtained was put into a cylindrical molding die (φ10) having an internal space. Furthermore, 150 μL of 1M acetic acid was added to the mixed powder filled inside the molding die. Then, the test sample of the present example was obtained by heating and pressurizing the mixed powder containing the acetic acid under the condition of 50 MPa, 150° C., and 20 minutes.

Comparative Example

A test sample of the present example was obtained in the same manner as in the example except that no organic infrared absorbing material was added.

(Evaluation of Test Sample)

<Surface Observation>

As a result of visually observing the test sample of the example, the surface of the test sample showed a black color derived from the organic infrared absorbing material. Further, the test sample of the example had a high hardness like a sintered body.

As a result of visually observing the test sample of the comparative example, the surface of the test sample showed a white color derived from zinc oxide. The test sample of the comparative example also had a high hardness like a sintered body.

<Porosity Measurement>

Figure 8:
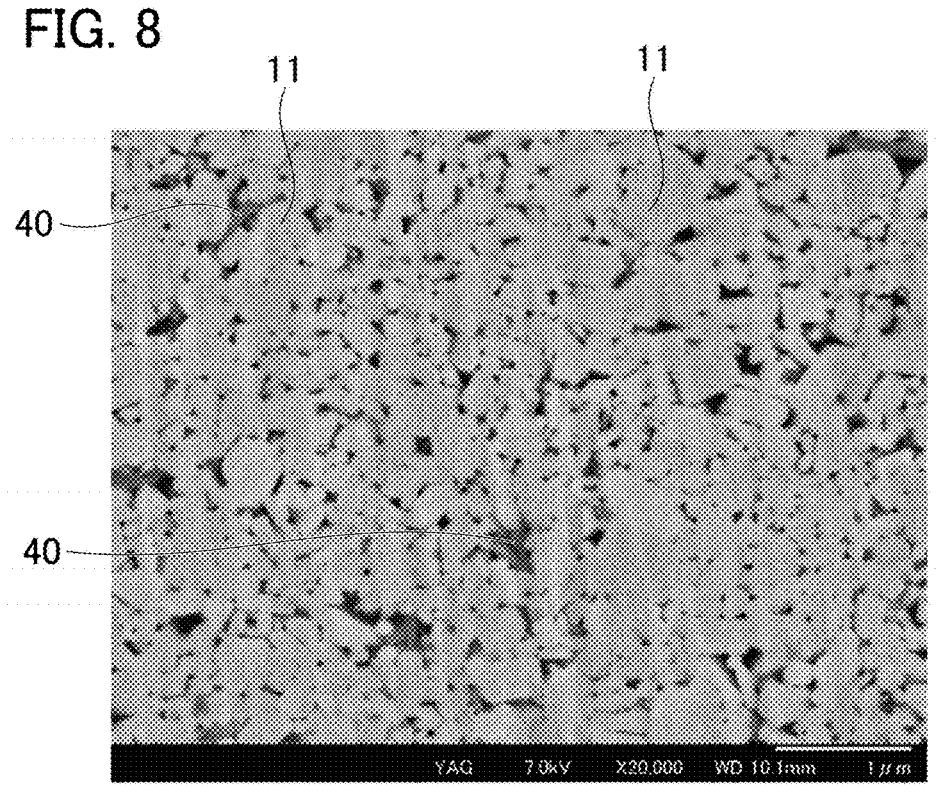
FIG. 8 is a diagram illustrating a back-scattered electron image at position 1 in a test sample according to an example.
Figure 9:
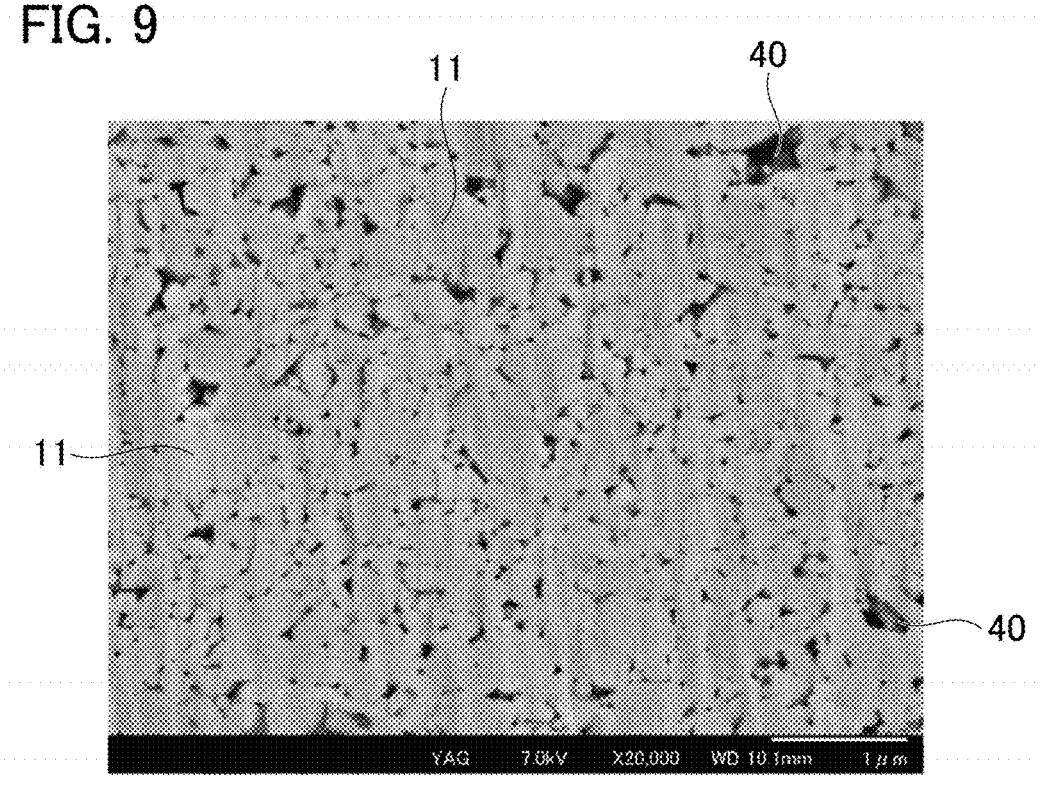
FIG. 9 is a diagram illustrating a back-scattered electron image at position 2 in the test sample according to the example.
Figure 10:
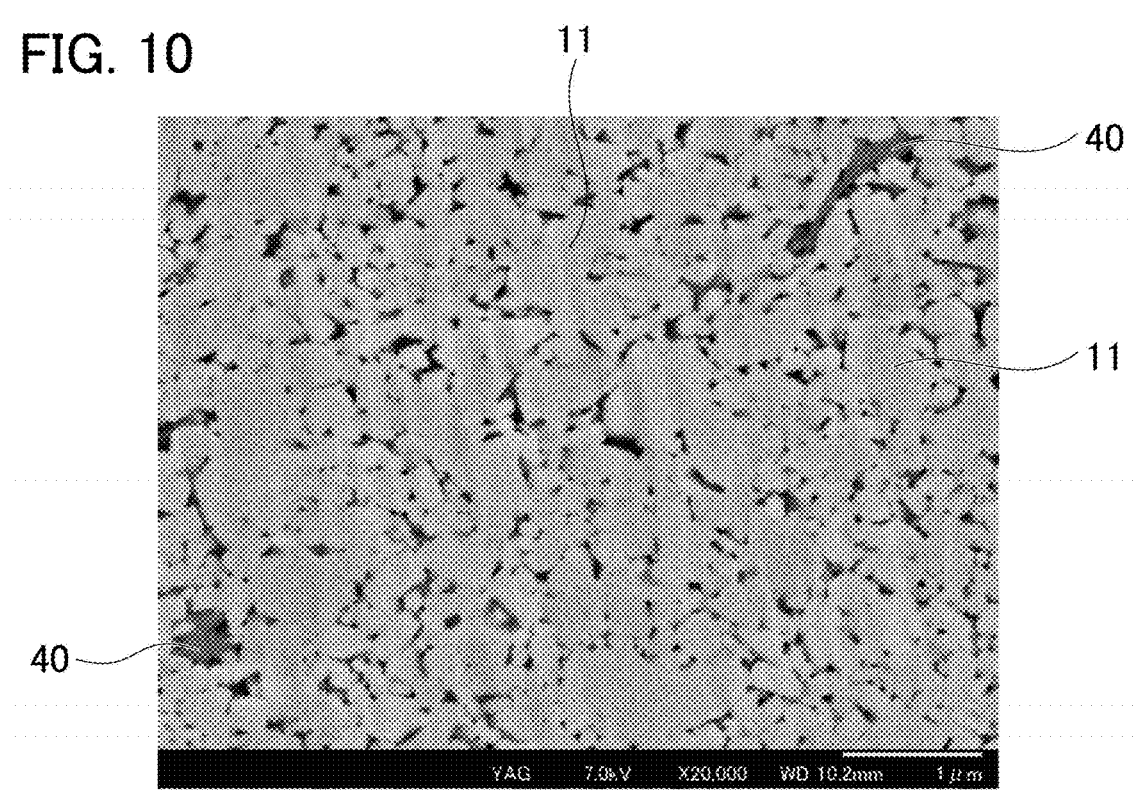
FIG. 10 is a diagram illustrating a back-scattered electron image at position 3 in the test sample according to the example.

First, cross section polisher processing (CP processing) was applied to the section of the test sample of the example, which is cylindrical. Next, using a scanning electron microscope (SEM), a back-scattered electron image was observed at a magnification of 20,000 on the section of the test sample. FIGS. 8 to 10 show back-scattered electron images obtained by observing three points (positions 1 to 3) in the section of the test sample. In the observed back-scattered electron images, a white portion indicates zinc oxide (particles 11 of the inorganic substance) and the organic infrared absorbing material 20, and a black portion indicates a pore 40.

Figure 11:
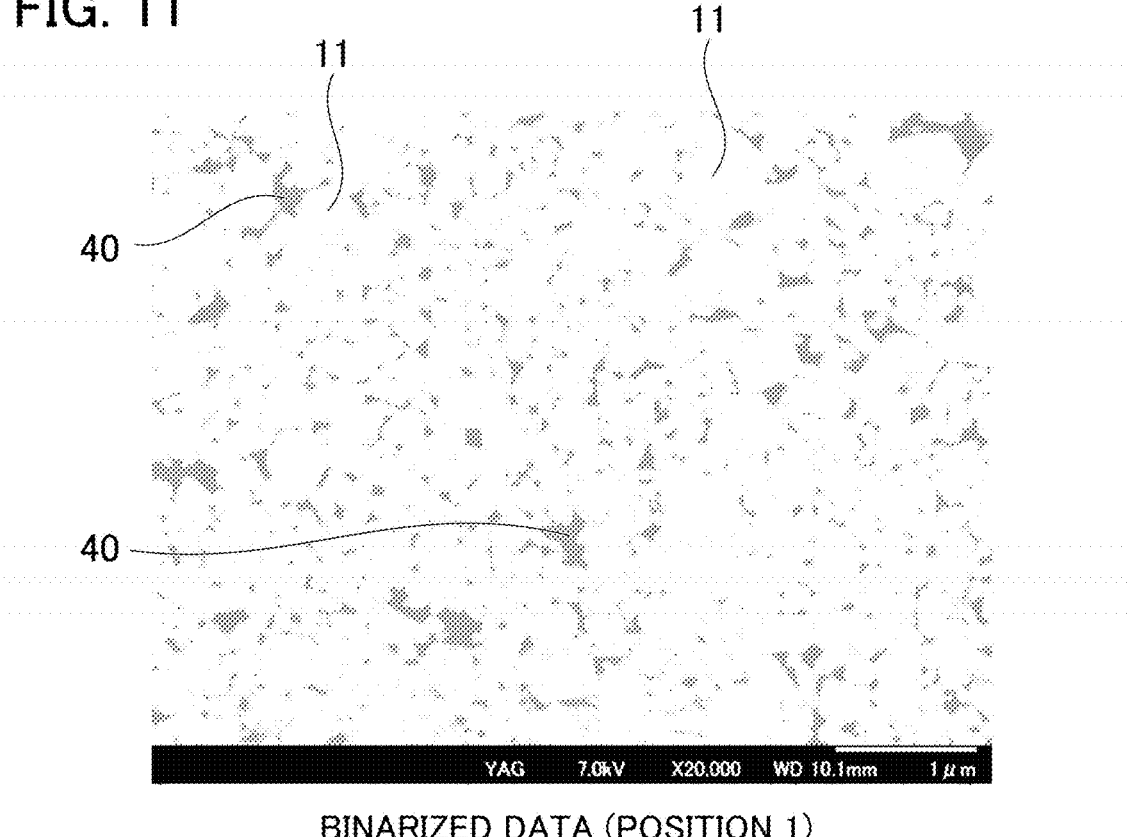
FIG. 11 is a diagram illustrating binarized data of the back-scattered electron image at position 1 in the test sample according to the example.
Figure 12:
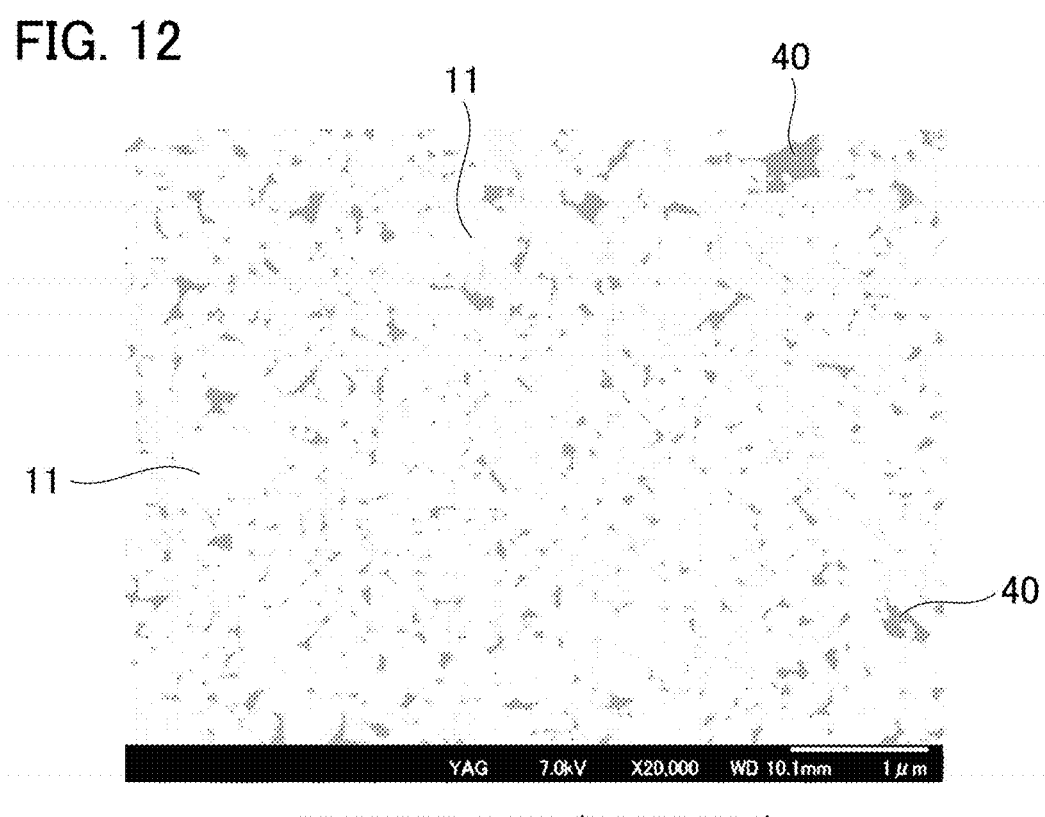
FIG. 12 is a diagram illustrating binarized data of the back-scattered electron image at position 2 in the test sample according to the example.
Figure 13:
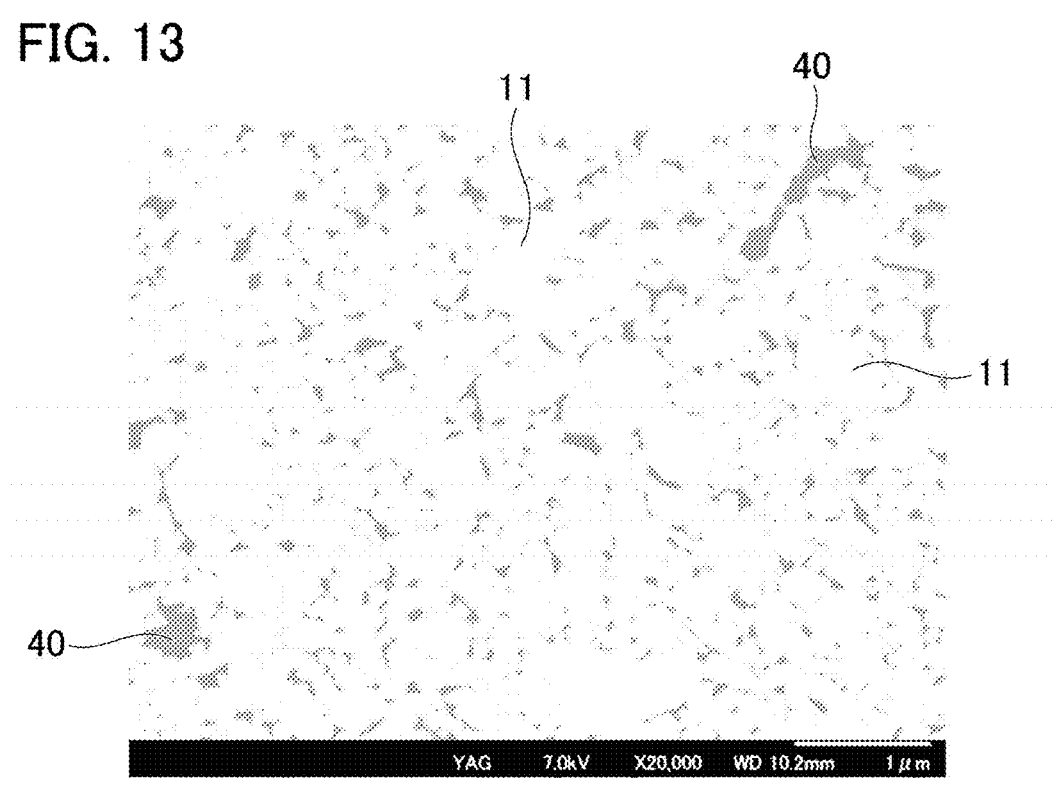
FIG. 13 is a diagram illustrating binarized data of the back-scattered electron image at position 3 in the test sample according to the example.

Next, by binarizing the SEM images of the three fields, the pore portions were clarified. The binarized images of the back-scattered electron images of FIGS. 8 to 10 are illustrated in FIGS. 11 to 13, respectively. Then, the area ratio of the pore portion was calculated from the binarized images, and the average value was taken as the porosity. Specifically, in FIG. 11, the area ratio of the pore portion at position 1 was 8.7%. In FIG. 12, the area ratio of the pore portion at position 2 was 7.3%. In FIG. 13, the area ratio of the pore portion at position 3 was 8.1%. Therefore, the porosity of the test sample produced this time was 8.0%, which is the average value of the area ratio of the pore portion at positions 1 to 3.

As described above, since the organic infrared absorbing material was present in a dispersed state inside the zinc oxide particles, the test sample of this example was black due to the organic infrared absorbing material. It is seen from FIGS. 8 to 10 that the organic infrared absorbing material is present at grain boundaries of the zinc oxide particles. The porosity of the test sample is less than 10%, which indicates that the organic infrared absorbing material is prevented from contacting with air and water vapor, thus reducing oxidative deterioration.

<Temperature Change Measurement>

Test samples of the example and comparative example were each irradiated with infrared rays having a wavelength of 840 nm for 3 minutes using LED lights. Then, the surface temperature of each test sample before and after irradiation with infrared rays was measured with a thermocouple. As a result, in the test sample of the example, the temperature rise before and after the irradiation with infrared rays was 3.0° C. In contrast, in the test sample of the comparative example, the temperature rise before and after the irradiation with infrared rays was 1.7° C.

Thus, it is seen that the organic infrared absorbing material is stably dispersed in the test sample of the example, and when irradiated with infrared rays, the organic infrared absorbing material absorbs infrared rays to generate heat.

Reference Example (Preparation of Test Sample)

Figure 14:
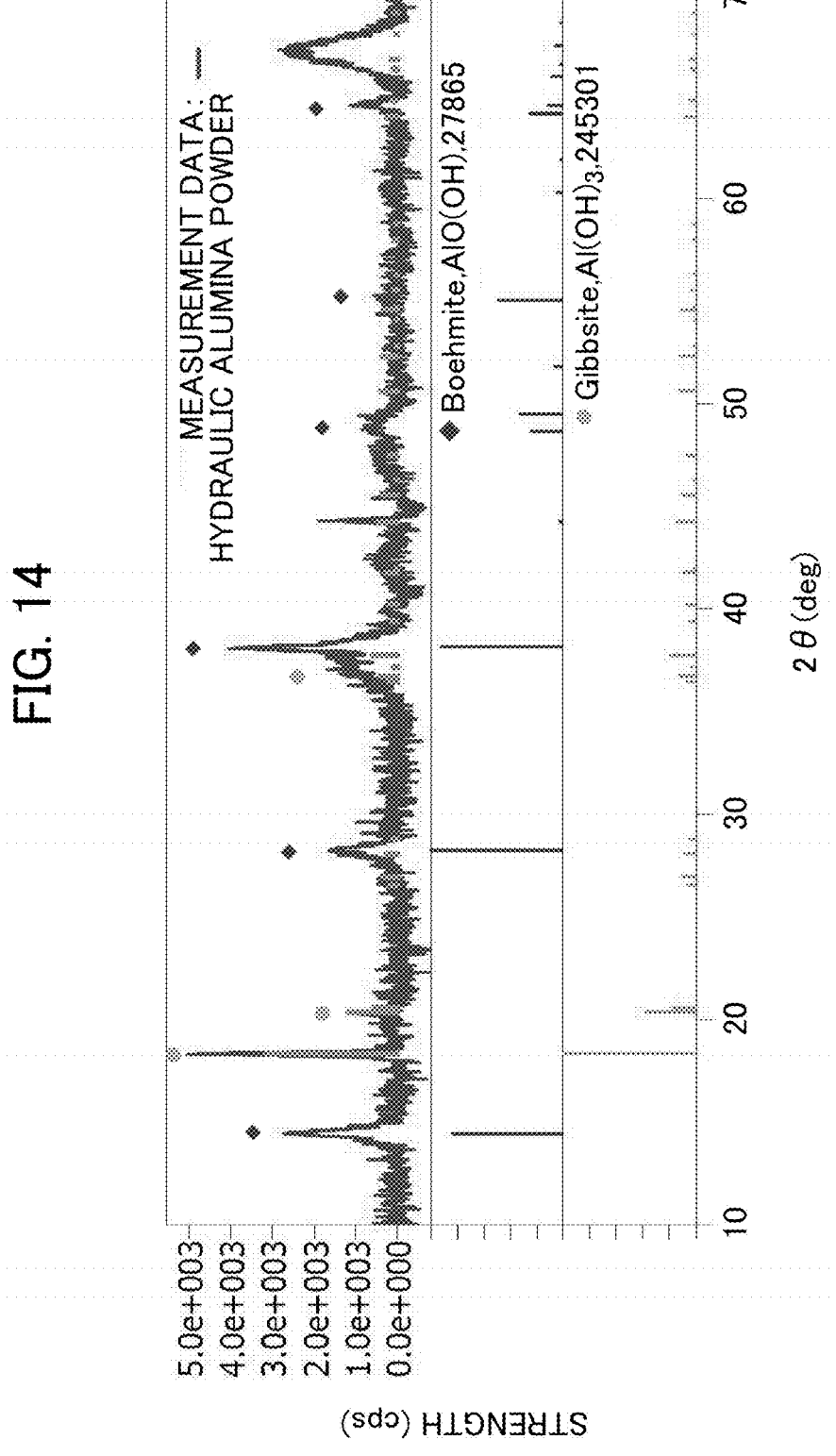
FIG. 14 is a graph illustrating an X-ray diffraction pattern of hydraulic alumina used in a reference example and patterns of boehmite (AlOOH) and gibbsite (Al(OH)$_3$) registered in the ICSD.

Hydraulic alumina BK-112 manufactured by SUMITOMO CHEMICAL COMPANY, LIMITED was prepared as the inorganic particles. Note that this hydraulic alumina has the central particle size of 16 μm. FIG. 14 illustrates the X-ray diffraction pattern of powder of the above-described hydraulic alumina and patterns of boehmite (AlOOH) and gibbsite (Al(OH)$_3$) registered in the ICSD. As illustrated in FIG. 14, it is seen that the hydraulic alumina is a mixture of boehmite and gibbsite. Although not illustrated in FIG. 14, the hydraulic alumina also includes ρ alumina.

Next, ion exchange water was weighed to be 80% by mass to the hydraulic alumina, and then the hydraulic alumina and the ion exchange water were mixed by using a mortar and pestle made of agate to obtain a mixture. Next, the mixture obtained was put into a cylindrical molding die (φ10) having an internal space. The test sample of the present example was obtained by heating and pressurizing the mixture under the condition of 50 MPa, 120° C., and 20 minutes. The test sample of this example had a high hardness like a sintered body.

(Evaluation of Test Sample)

<X-ray Diffraction Measurement>

Figure 15:
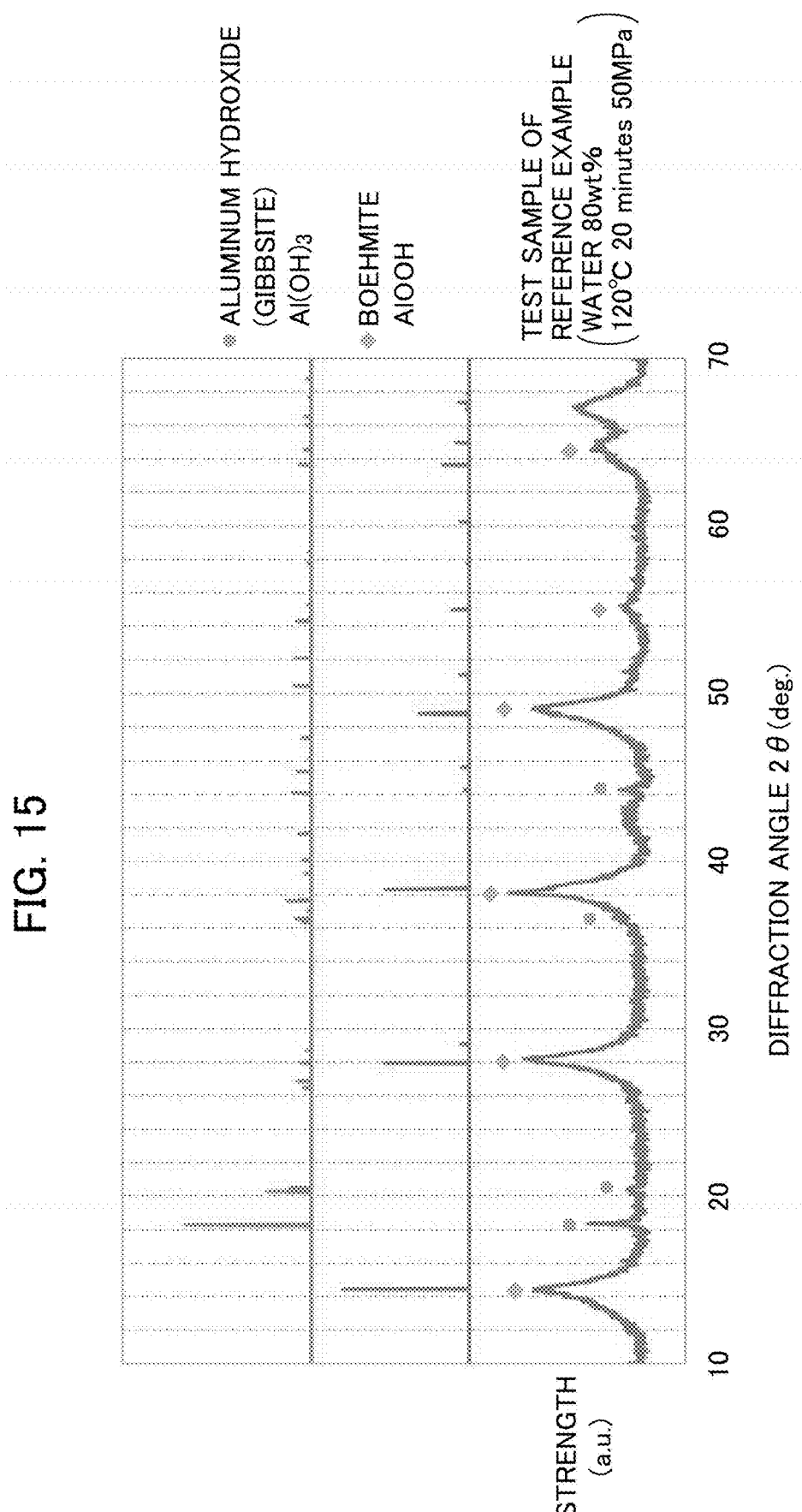
FIG. 15 is a graph illustrating an X-ray diffraction pattern of a test sample of the reference example and X-ray diffraction patterns of boehmite and gibbsite registered in the ICSD.

The X-ray diffraction pattern of the test sample of the reference example was measured using an X-ray diffraction apparatus. FIG. 15 illustrates the X-ray diffraction pattern of the test sample of reference example and X-ray diffraction patterns of boehmite and gibbsite registered in the ICSD. It is seen from FIG. 15 that the test sample of reference example is a structure mainly made from boehmite. Therefore, as illustrated in FIGS. 14 and 15, it is seen that gibbsite (aluminum hydroxide), which is the raw material, changes to boehmite by a low-temperature sintering method.

Thus, it is seen that the matrix part 10 made from boehmite is obtained by the low-temperature sintering method. Therefore, by dispersing the organic infrared absorbing material 20 in the matrix part 10, the composite member 100 that is lightweight and excellent in chemical stability is obtained.

Although the contents of the present embodiment have been described above with reference to the examples and reference examples, it is obvious to those skilled in the art that the present embodiment is not limited to these descriptions and that various modifications and improvements are possible.

The entire contents of Japanese Patent Application No. 2019-059090 (filed on: Mar. 26, 2019) are incorporated herein by reference.

INDUSTRIAL APPLICABILITY

According to the present disclosure, there is provided a composite member that enhances the stability of an infrared absorbing material and maintains the infrared absorbing ability for a long period of time when the organic infrared absorbing material is used, and a heat generation device, a building member, and a light emitting device each using the composite member.

REFERENCE SIGNS LIST

10 Matrix part
10a Surface of matrix part
10b Gap
11 Particles of inorganic substance
20 Organic infrared absorbing material
22 Organic thermochromic material
100, 100A, 100B Composite member
110 Infrared light source
200 Heat generation device

The invention claimed is:

1. A composite member comprising:
   a matrix part comprising multiple particles made from an inorganic substance, the particles of the inorganic substance bonding with each other to form the matrix part; and
   an organic infrared absorbing material present in a dispersed state inside the matrix part,
   wherein the inorganic substance consists of at least one substance selected from the group consisting of an oxide of a metal element, a nitride of the metal element, a hydroxide of the metal element, a sulfide of the metal element, a boride of the metal element, a carbide of the metal element, and a halide of the metal element, wherein the metal element is selected from the group consisting of an alkali metal, an alkaline earth metal, a transition metal, and a base metal, wherein the inorganic substance contains the at least one substance in an amount of 50 mol % or more, wherein the particles of the inorganic substance bond with each other via a connection part derived from the inorganic substance, and wherein, when a cross section of the matrix part is observed, an average value of a percentage of pores per unit area is 20% or less.

2. The composite member according to claim 1, wherein the organic infrared absorbing material is not continuously present from a surface of the matrix part to an inside of the matrix part, and the organic infrared absorbing material is not present in a film shape on the surface of the matrix part.

3. The composite member according to claim 1, wherein the matrix part has no gap communicating from a surface of the matrix part to an inside of the matrix part.

4. The composite member according to claim 1, wherein the porosity in the cross section of the matrix part is 10% or less.

5. The composite member according to claim 1, wherein the inorganic substance is the oxide of the metal element.

6. The composite member according to claim 1, wherein the inorganic substance is a polycrystalline substance, and the connection part is an amorphous part containing amorphous inorganic compound.

7. The composite member according to claim 1, wherein the matrix part comprises a particle group of the inorganic substance, and the organic infrared absorbing material is present at grain boundaries of particles of the inorganic substance.

8. The composite member according to claim 1, wherein the inorganic substance transmits infrared rays.

9. The composite member according to claim 1, further comprising:

an organic thermochromic material present within the matrix part.

10. The composite member according to claim 9, wherein the organic thermochromic material is closer to a surface of the matrix part within the matrix part compared to the organic infrared absorbing material, the surface being irradiated with infrared rays.

11. A heat generation device comprising:

the composite member according to claim 1; and an infrared light source configured to irradiate the composite member with infrared rays.

12. A building member comprising:

the composite member according to claim 1.

13. A light emitting device comprising:

the composite member according to claim 1.

14. The composite member according to claim 6, wherein the particles of the inorganic substance and the amorphous part contain same metal element.

15. The composite member according to claim 1, wherein an average particle size of the particles of the inorganic substance making up the matrix part is from 300 nm to 30 μm.

16. The composite member according to claim 1, wherein the inorganic substance making up the matrix part does not contain hydrates, phosphate cement, zinc phosphate cement, and calcium phosphate cement.

17. The composite member according to claim 1, wherein the organic infrared absorbing material dispersed inside the matrix part is a dye made from an organic compound and having a maximum absorption wavelength in the range of 780 nm to 1500 μm.

18. The composite member according to claim 1, wherein the organic infrared absorbing material comprises at least one selected from the group consisting of an azo metal complex, a triphenylamine azo dye, a cyanine dye, a squarylium dye, a phthalocyanine dye, a dithiolate complex dye, and a diimmonium salt dye.

19. The composite member according to claim 1, wherein a thickness of the matrix part is 100 μm or more.

20. The composite member according to claim 9, wherein the organic thermochromic material comprises at least one selected from the group consisting of a bianthrone dye, a spirooxazine dye, a spiropyran dye, and a salicylideneaniline dye.

* * * * *